United States Patent [19]

Inohana et al.

[11] Patent Number: 4,890,170
[45] Date of Patent: Dec. 26, 1989

[54] WAVEFORM EQUALIZATION CIRCUIT FOR A MAGNETIC REPRODUCING DEVICE

[75] Inventors: Haruyuki Inohana; Saburo Takaoka, both of Saitama; Hideaki Takada, Saga, all of Japan

[73] Assignees: Pioneer Electronic Corporation; Hitachi, Ltd., both of Tokyo, Japan

[21] Appl. No.: 234,863

[22] Filed: Aug. 22, 1988

[30] Foreign Application Priority Data

Aug. 20, 1987 [JP] Japan .................................. 62-205011

[51] Int. Cl.$^4$ ................................................ G11B 5/09
[52] U.S. Cl. .......................................... 360/65; 360/46
[58] Field of Search ............................ 360/46, 65, 67; 333/28 R; 369/174, 175

[56] References Cited

FOREIGN PATENT DOCUMENTS

| 53-3760 | 1/1978 | Japan | 333/28 R |
|---|---|---|---|
| 53-20748 | 2/1978 | Japan | 333/28 R |
| 60-255462 | 5/1987 | Japan | 333/28 R |
| 2151098 | 7/1985 | United Kingdom | 360/65 |

OTHER PUBLICATIONS

*Transistors* by Dennis Le Croissette, Prentice-Hall, Inc., 1963, pp. 167–168.

*Primary Examiner*—Vincent P. Canney
*Attorney, Agent, or Firm*—Sughrue, Mion, Zinn, Macpeak & Seas

[57] ABSTRACT

In a waveform equalization circuit, a digital signal is applied through a first network having a transfer function defined by four angular frequencies to one of the inversion and non-inversion input terminals of an amplifier and through a second network having a transfer function made up of a constant to the other input terminal, so that the digital signal subjected to waveform equalization is provided at the output terminal, whereby according to the transfer characteristic of the recording or reproducing system, the most suitable waveform equalization characteristic can be obtained with ease.

15 Claims, 3 Drawing Sheets

WAVEFORM EQUALIZATION CIRCUIT FOR A MAGNETIC REPRODUCING DEVICE

BACKGROUND OF THE INVENTION

This invention relates to a waveform equalization circuit in a magnetic reproducing device, such as a rotary head type digital audio tape recorder, which is adapted to reproduce digital signals recorded on a magnetic recording medium.

A reproducing head used for magnetic reproduction performs differential reproduction, and it therefore theoretically has an output voltage characteristic of +6 dB/octave, however, in practice the high frequency range is damped because of various factors such as for instance high frequency loss. In order to overcome this difficulty, a waveform equalization circuit has been employed which corrects the signal level so as to reproduce the recorded signal waveform with high fidelity, taking into account the output voltage characteristic of the above-described reproducing head.

A generally applied waveform equalization circuit of this type is shown in FIG. 6.

In FIG. 6, reference numeral 1 designates an input terminal to which a signal $e_i$ is applied and which is reproduced by the reproducing head (not shown) and amplified; numeral 2 designates an output terminal through which a signal $e_o$ obtained using a predetermined waveform equalization is outputted; and 3 designates an amplifier having a gain $A_0$, and having a non-inversion input terminal to which a signal $e_{ip}$ is applied, a an inversion output terminal through which a signal $e_{in}$ is inputted, a non-inversion output terminal through which a signal $e_{op}$ is outputted, and an inversion output terminal through which a signal $e_{on}$ is outputted. Further, in FIG. 6, reference characters $C_1$ through $C_3$, and $R_1$ through $R_3$ designate capacitors and resistors, respectively, which are required for obtaining a predetermined transfer characteristic.

In FIG. 6, transfer functions G(s) and $G_1$(s) through $G_4$(s) are determined as follows:

$$G(s) = e_o/e_i \quad (1)$$

$$G_1(s) = e_{ip}/e_i \quad (2)$$

$$G_2(s) = e_{in}/e_i \quad (3)$$

$$G_3(s) = e_{op}/e_i \quad (4)$$

$$G_4(s) = e_{on}/e_i \quad (5)$$

Then, the following equations (6), (7) and (8) can be obtained:

$$G_1(s) = 1/(SC_2R_2 + 1) \quad (6)$$

$$G_2(s) = SC_1R_1/(SC_1R_1 + 1) \quad (7)$$

$$G_3(s) = A_0(G_1(s) - G_2(s)) \quad (8)$$

By inserting equations (6) and (7) in equation (8), the following equation (9) can be obtained:

$$G_3(s) = A_0 \left( \frac{1 - S^2 C_1 C_2 R_1 R_2}{(SC_1R_1 + 1)(SC_2R_2 + 1)} \right) \quad (9)$$

In addition, the following equations (10) and (11) can be obtained:

$$G_4(s) = -G_3(s) \quad (10)$$

$$G(s) = G_4(s) + (G_3(s) - G_4(s)) \cdot 1/SC_3R_3 + 1 \quad (11)$$

By inserting equations (9) and (10) in equation (11), the following equation (12) can be obtained:

$$\begin{aligned} G(s) &= -G_3(s) + (G_3(s) + G_3(s)) \cdot \frac{1}{SC_3R_3 + 1} \\ &= G_3(s) \left( \frac{2}{SC_3R_3 + 1} - 1 \right) \\ &= \frac{A_0(1 - S^2C_1C_2R_1R_2)}{(SC_1R_1 + 1)(SC_2R_2 + 1)} \cdot \frac{1 - SC_3R_3}{1 + SC_3R_3} \end{aligned} \quad (12)$$

In equation (12), the first and second terms are represented by $F_1$(s) and $F_2$(s), respectively, as follows:

$$F_1(s) = \frac{A_0(1 - S^2C_1C_2R_1R_2)}{(SC_1R_1 + 1)(SC_2R_2 + 1)} \quad (13)$$

$$F_2(s) = \frac{1 - SC_3R_3}{1 + SC_3R_3} \quad (14)$$

In this case, $F_1$(s) realizes the predetermined gain characteristic, and $F_2$(s) controls only the phase characteristic with the amplitude maintained unchanged.

When, in FIG. 6, the values of the capacitors $C_1$ through $C_3$ and the resistors $R_1$ through $R_3$, and the gain $A_0$ of the amplifier 3 are determined so as to conform the following equations (15) through (18), then the frequency-gain characteristic and the frequency-phase characteristic are as indicated by the solid line and the broken line in FIG. 7, respectively.

$$f_{c1} = 1/2\pi C_2 R_2 = 100 \text{ KHz} \quad (15)$$

$$f_{c2} = 1/2\pi C_1 R_1 = 10 \text{ MHz} \quad (16)$$

$$f_{c3} = 1/2\pi C_3 R_3 = 5 \text{ MHz} \quad (17)$$

$$A_0 = 1 \quad (18)$$

As shown in FIG. 7, the frequency-gain characteristic of the above-described generally applied circuit is about 0 dB in a frequency range not higher than $f_{c1}$, and decreases substantially at a rate of −6 dB/oct in a frequency range of from $f_{c1}$ to $\sqrt{f_{c1}f_{c2}}$. The frequency-gain characteristic is the lowest at the point of the frequency of $\sqrt{f_{c1}f_{c2}}$. Then, the frequency-gain characteristic increases substantially at a rate of +6 dB/oct in a frequency range of from $\sqrt{f_{c1}f_{c2}}$ to $f_{c2}$, and is about 0 dB in a frequency range not lower than $f_{c2}$. The frequency-gain characteristic is determined by the factors $f_{c1}$ and $f_{c2}$ only; that is, the degree of freedom in determination of the frequency-gain characteristic is small. Therefore, in the waveform equalization circuit, it is difficult to optimize the characteristic to minimize the error rate of the digital signal.

In order to transfer reproduced digital signal without distortion, it is essential that a waveform equalization circuit in a rotary head type digital audio tape recorder or the like have a transfer characteristic as shown in FIG. 8 in which the shaded parts A and B are of a point symmetry. Therefore, the frequency-gain characteristic of the waveform equalization circuit must change, for instance, with the operating characteristic of a reproducing head employed. However, in the circuit shown in FIG. 6, the gain characteristic in the high frequency range is fixed at 0 dB similarly as that in the low frequency range. Therefore, when the gain in the high frequency range is required to be other than 0 dB, the provision of a low-pass filter capable of changing the gain characteristic in the high frequency range at the rear stage of the circuit of FIG. 6 is needed. The resultant circuit is unavoidably intricate in arrangement.

SUMMARY OF THE INVENTION

Accordingly, an object of this invention is to eliminate the above-described difficulties accompanying a generally applied waveform equalization circuit.

More specifically, an object of the invention is to provide a waveform equalization circuit in which the degree of freedom for determination of the frequency-gain characteristic can be increased while maintaining relatively simple circuitry, and the characteristic required for waveform equalization of digital signals can be easily optimized.

The foregoing object and other objects of the invention have been achieved by the provision of a waveform equalization circuit which, according to the invention, comprises: an amplifier having a non-inversion input terminal and an inversion input terminal; a first network having a function characteristic represented by a function $H_1(s)$ defined by the following equation, through which a digital signal, read from a magnetic medium by a magnetic head, is applied to one of the two input terminals of the amplifier:

$$H_1(s) = K \frac{(s + \sigma_1)(s - \sigma_2)}{(s + \sigma_3)(s \mp \sigma_4)} + k$$

where K ad k are the constants, and $\sigma_1$ through $\sigma_4$ are the angular frequencies satisfying relations $\sigma_3 < \sigma_1 < \sigma_4$, and $\sigma_3 < \sigma_2 < \sigma_4$;

and a second network having a transfer characteristic represented by a function $H_2(s)$ defined by the following equation, through which the digital signal is applied to the other input terminal of the amplifier:

$$H_2(s) = k$$

so that the amplifier outputs the digital signal subjected to waveform equations.

The nature, principle and utility of the invention will become more apparent from the following detailed description which read in conjunction with the accompanying drawings.

DETAILED DESCRIPTION OF THE INVENTION

Preferred embodiments of this invention will be described with reference to the accompanying drawings.

Figure 1:
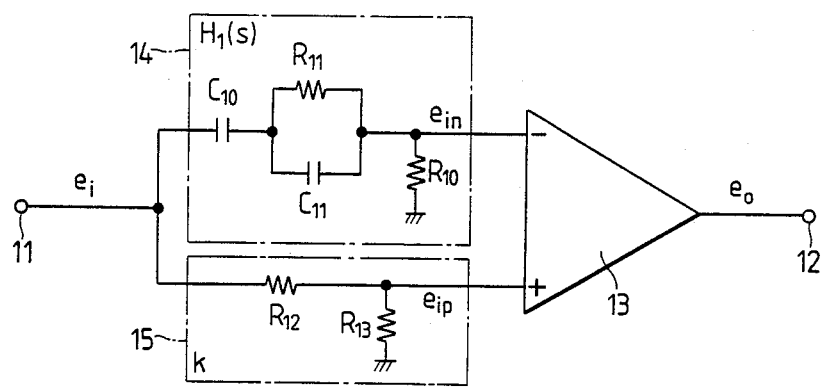
FIG. 1 is a circuit diagram showing a first embodiment of a waveform equalization circuit according to this invention.

A first embodiment of a waveform equalization circuit according to the present invention is shown in FIG. 1. In FIG. 1, reference numeral 11 designates an input terminal to which a signal $e_i$ is applied; 12 designates an output terminal through which a signal $e_o$ is outputted; 13 designates a differential amplifier having a gain $A_1$, and having a non-inversion (+) input terminal to which a signal $e_{ip}$ is applied, and an inversion (−) input terminal to which a signal $e_{in}$ is applied; and 14 and 15 designate first and second networks, respectively.

The first network 14 is connected between the input terminal 11 and the inversion input terminal of the differential amplifier 13, and has a transfer function $H_1(s)$. The first network 14 includes passive elements, namely, capacitors $C_{10}$ and $C_{11}$ and resistors $R_{10}$ and $R_{11}$. More specifically, the capacitor $C_{10}$ and the parallel circuit of the capacitor $C_{11}$ and the resistor $R_{11}$ are series-connected between the input terminal 11 and the inversion input terminal of the differential amplifier 13, which is grounded through the resistor $R_{10}$.

The second network 15 is connected between the input terminal 11 and the non-inversion input terminal of the differential amplifier 13, and has a transfer function $H_2(s)$. The second network 15 includes passive elements, namely, resistors $R_{12}$ and $R_{13}$. More specifically, the resistor $R_{12}$ is connected between the input terminal 11 and the non-inversion input terminal of the differential amplifier 13, which is grounded through the resistor $R_{13}$.

The transfer function $H_1(s)$ of the first network 14 is as follows:

$$H_1(s) = \frac{e_{in}}{e_i} = \frac{S^2 C_{10} C_{11} R_{10} R_{11} + S C_{10} R_{10}}{S^2 C_{10} C_{11} R_{10} R_{11} + 1 + S(C_{11} R_{11} + C_{10} R_{11} + C_{10} R_{10})} \quad (19)$$

where $S = jw$

Equation (19) can be rewritten by using angular frequencies $\sigma_1$ through $\sigma_4$ (where $\sigma_3 < \sigma_1 < \sigma_4$, and $\sigma_3 < \sigma_2 < \sigma_4$) as follows:

$$H_1(s) = K \frac{(s + \sigma_1)(s - \sigma_2)}{(s + \sigma_3)(s \pm \sigma_4)} + k \quad (20)$$

In connection with this equation (20), $$R_{10} = 1 \quad (21)$$

$$R_{11} = \frac{\sigma_7}{\sigma_5} \quad (22)$$

$$k = \frac{\sigma_1 \sigma_2}{\sigma_3 \sigma_4 + \sigma_1 \sigma_2} \quad (23)$$

$$C_{10} = \frac{1}{\sigma_6} \quad (24)$$

$$C_{11} = \frac{1}{\sigma_7} \quad (25)$$

$$\sigma_5 = \frac{\sigma_3 \sigma_4 (\sigma_1 - \sigma_2) + \sigma_1 \sigma_2 (\sigma_3 + \sigma_4)}{\sigma_3 \sigma_4 + \sigma_1 \sigma_2} \quad (26)$$

$$\sigma_6 = \frac{\sigma_3 \sigma_4}{\sigma_5} \quad (27)$$

$$\sigma_7 = \frac{(\sigma_3 + \sigma_4 - \sigma_5) \cdot \sigma_5 - \sigma_3 \sigma_4}{\sigma_5} \quad (28)$$

$$K = \frac{\sigma_3 \sigma_4}{\sigma_3 \sigma_4 + \sigma_1 \sigma_2} \quad (29)$$

On the other hand, the transfer function $H_2(s)$ of the second network 15 is as follows:

$$H_2(s) = \frac{e_{ip}}{e_i} \quad (30)$$
$$= \frac{R_{13}}{R_{12} + R_{13}}$$

Equation (30) can be rewritten by using the angular frequencies $\sigma_1$ through $\sigma_4$ as follows:

$$H_2(s) = \frac{\sigma_1 \sigma_2}{\sigma_3 \sigma_4 + \sigma_1 \sigma_2} \ (= k) \quad (31)$$

Therefore, the total transfer function $T(s)$ of the whole circuit from the input terminal 11 to the output terminal 12 is as follows:

$$T(s) = K \left\{ \frac{(s + \sigma_1)(s - \sigma_2)}{(s + \sigma_3)(s + \sigma_4)} + k - k \right\} A_1 \quad (32)$$
$$= A_1 \cdot K \cdot \frac{(s + \sigma_1)(s - \sigma_2)}{(s + \sigma_3)(s + \sigma_4)}$$

where $A_1$ is the gain of the amplifier 13.

It is assumed that the angular frequency $\sigma_1$ through $\sigma_4$ of an anticipated frequency-gain characteristic for the waveform equalization circuit are as follows, and the gain in the low frequency range is 0 dB.

$$\sigma_1 = 2\pi \cdot 1 \text{ MHz} \quad (33)$$

$$\sigma_2 = 2\pi \cdot 5 \text{ MHz} \quad (34)$$

$$\sigma_3 = 2\pi \cdot 100 \text{ KHz} \quad (35)$$

$$\sigma_4 = 2\pi \cdot 10 \text{ MHz} \quad (36)$$

In this case, the values of the circuit elements of the first and second networks 14 and 15 can be calculated by using the above-described equations (21) through (28).

Figure 2:
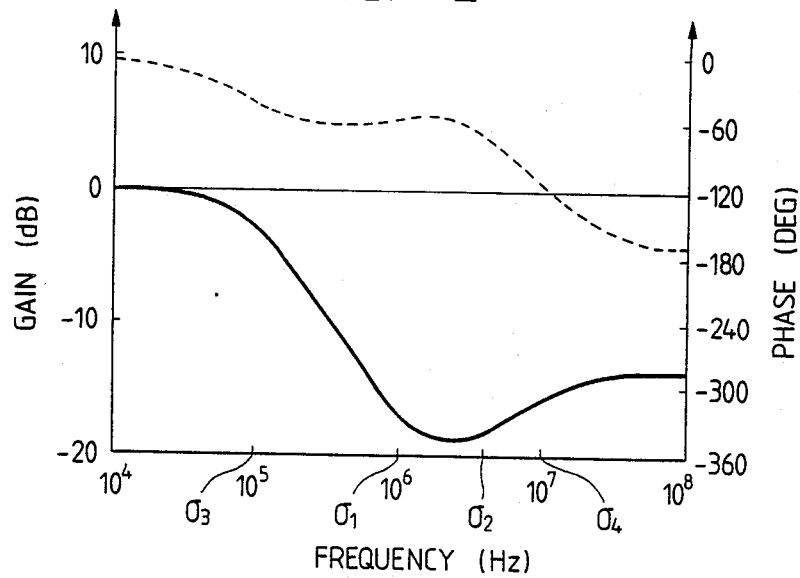
FIG. 2 is a graphical representation showing a frequency-gain characteristic and a frequency-phase characteristic when the values of a circuit element in the circuit shown in FIG. 1 are set.

The frequency-gain characteristic, and the frequency-phase characteristic of the transfer function $T(s)$ of the waveform equalization circuit of FIG. 1 in which the values of the circuit elements have been determined by these calculations are as indicated by the solid line and the broken line in FIG. 2, respectively. And the characteristics can be changed by adjusting the values of the circuit elements which are obtained through the above-described calculations. That is, the equalization characteristic can be optimized according to the transfer characteristic of the practical recording and reproducing system.

Figure 3:
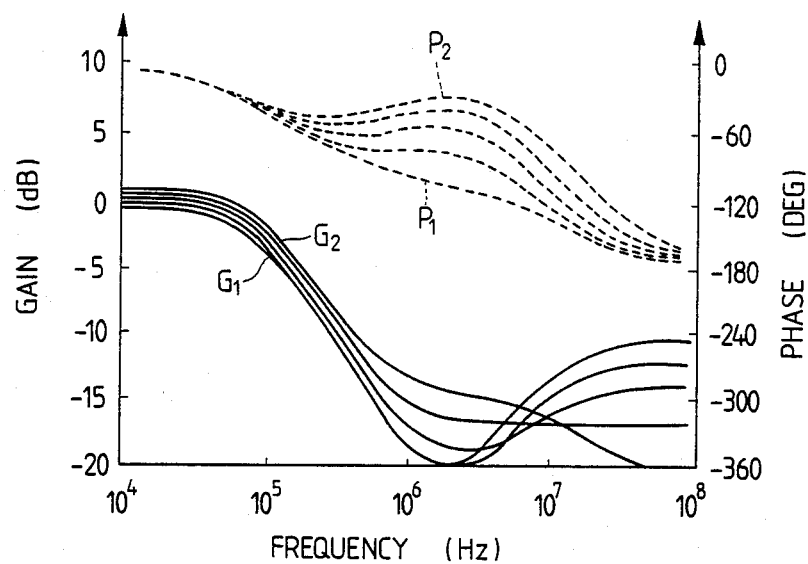
FIG. 3 is a graphical representation showing frequency-gain characteristics and frequency-phase characteristics provided when the values of the circuit elements of FIG. 1 are changed.

FIG. 3 shows the transfer characteristics provided when the values of the resistors $R_{12}$ and $R_{13}$ of the second network 15 are changed so that k is changed 5% each time in a range of from $-10\%$ to $+10\%$. In FIG. 3, $G_1$ and $G_2$ represent frequency-gain characteristics with $k = -10\%$ and $k - +10\%$, respectively, and $P_1$ and $P_2$ represent frequency-phase characteristics with $k = -10\%$ and $k = +10\%$, respectively. Thus, the characteristic of the equalization circuit can be finely adjusted by changing the values of the circuit elements while satisfying the above-described equation (32).

The angular frequencies $\sigma_1$ through $\sigma_4$ provided after the values of the circuit elements are changed can be obtained by using the following equations:

$$\sigma_5 = \frac{1}{C_1 R_1} \quad (37a)$$

$$\sigma_3 + \sigma_4 = \frac{1}{C_0 R_0} + \frac{1}{C_1 R_0} + \frac{1}{C_1 R_1} \quad (37b)$$

$$\sigma_3 \cdot \sigma_4 = \frac{1}{C_0 C_1 R_0 R_1} \quad (37c)$$

$$\sigma_1 - \sigma_2 = \frac{\sigma_5}{1 - k} - \frac{k(\sigma_3 + \sigma_4)}{1 - k} \quad (37d)$$

$$\sigma_1 \sigma_2 = \frac{\sigma_3 \sigma_4}{k/(1 - k)} \quad (37e)$$

Figure 4:
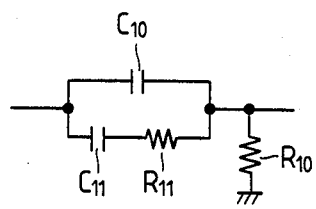
FIG. 4 is a circuit diagram showing one modification of a part of the circuit shown in FIG. 1.

An embodiment of the networks realizing the transfer functions $H_1(s)$ and $H_2(s)$ which satisfy equation (32) has been described. There are available a number of networks realizing $H_1(s)$. FIG. 4 shows another example of the network realizing $H_1(s)$ when the network realizing $H_2(s)$ is as shown in FIG. 1. In the first network of FIG. 4, a capacitor $C_{11}$ is serially connected to a resistor $R_{11}$. A capacitor $C_{10}$ is parallely connected to the serially connected capacitor $C_{11}$ and resistor $R_{11}$. The first network shown in FIG. 4 is connected between the input terminal 11 and the inversion input terminal of the amplifier 13 such that the parallely connected capacitor $C_{10}$ and the capacitor $C_{11}$ and the resistor $R_{11}$ are connected between the input terminal 11 and the inversion input terminal. Furthermore, the network of FIG. 4 has a resistor $R_{10}$. The resistor $R_{10}$ is connected between the inversion input terminal of the amplifier 13 and ground.

The transfer function $H_1(s)$ of the network shown in FIG. 4 is as follows:

$$H_1(s) = \quad (38)$$

$$\frac{S^2 C_{10}C_{11}R_{10}R_{11} + SR_{10}(C_{10} + C_{11})}{S\ C_{10}C_{11}R_{10}R_{11} + 1 + S\{C_{11}R_{11} + R_{10}(C_{10} + C_{11})\}}$$

When, in connection with the above-described equation (38), equations (39) through (46) are determined by using the angular frequencies $\sigma_1$ through $\sigma_4$ (rad/sec) of the transfer characteristic necessary for the waveform equalization characteristic, as follows, then an equation simila to the above-described equation (20) can be obtained, and $H_1(s)$ and $H_2(s)$ satisfying equation (32) can be realized.

$$R_{10} = 1 \tag{39}$$

$$R_{11} = \frac{1}{\sigma_{10}} \tag{40}$$

$$C_{10} = \frac{1}{\sigma_9} \tag{41}$$

$$C_{11} = \frac{\sigma_{10}}{\sigma_{11}} \tag{42}$$

$$\sigma_8 = \frac{\sigma_3 \sigma_4 (\sigma_1 - \sigma_2) + \sigma_1 \sigma_2 (\sigma_3 + \sigma_4)}{\sigma_3 \sigma_4 + \sigma_1 \sigma_2} \tag{43}$$

$$\sigma_9 = \sigma_3 + \sigma_4 - \sigma_8 \tag{44}$$

$$\sigma_{10} = \frac{\sigma_8 (\sigma_3 + \sigma_4 - \sigma_8) - \sigma_3 \sigma_4}{(\sigma_3 + \sigma_4 - \sigma_8)^2} \tag{45}$$

$$\sigma_{11} = \frac{\sigma_3 \sigma_4}{\sigma_3 + \sigma_4 - \sigma_8} \tag{46}$$

The circuit shown in FIG. 1 may be so modified that the outputs of the first and second networks 14 and 15 are applied to the non-inversion (+) input terminal and the inversion (−) input terminal of the differential amplifier 13, respectively. In this case, the effect is the same in waveform equalization, although the waveform subjected to waveform equalization is inverted.

Figure 5:
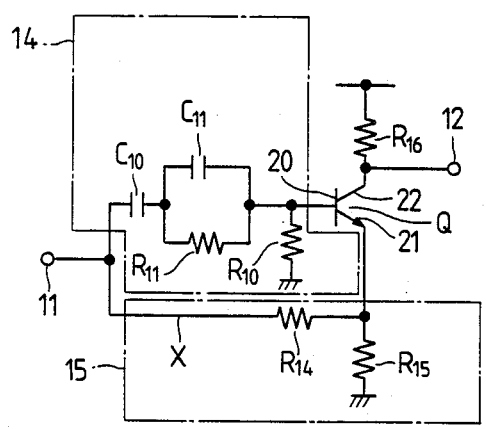
FIG. 5 is a circuit diagram showing a second embodiment of the waveform equalization circuit according to the invention.
Figure 6:
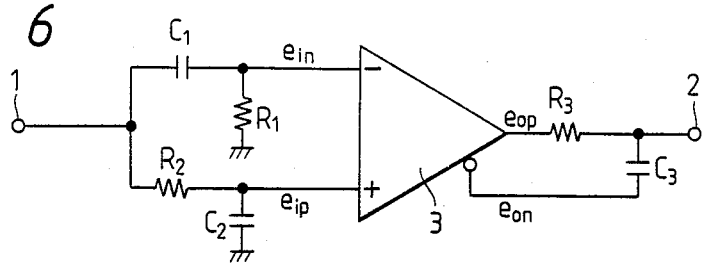
FIG. 6 is a circuit diagram showing a generally applied waveform equalization circuit.
Figure 7:
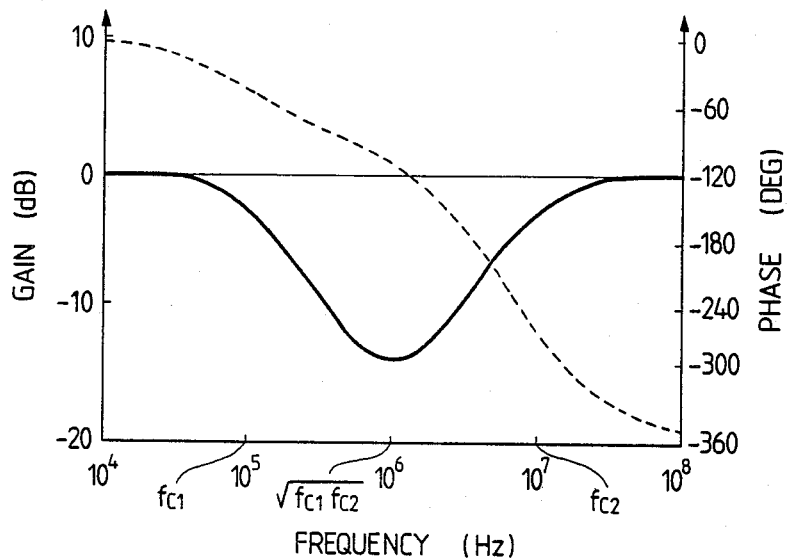
FIG. 7 is a graphical representation showing a frequency-gain characteristic and a frequency-phase characteristic provided by the conventional circuit shown in FIG. 6.
Figure 8:
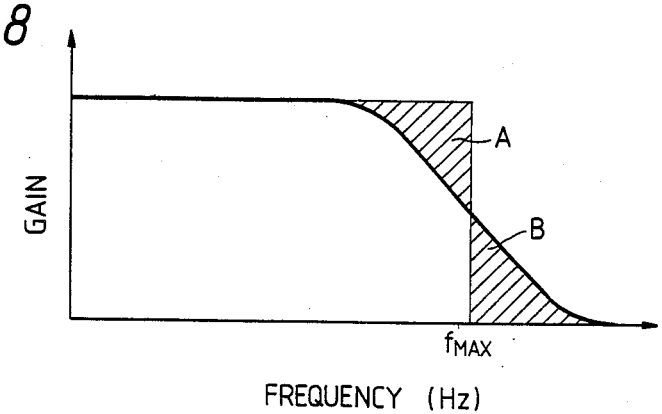
FIG. 8 is a graphical representation showing a transfer characteristic required for a digital signal transfer path.

In the above-described waveform equalization circuit, a differential amplifier having a non-inversion input terminal and an inversion input terminal is employed. However, the same effect can be obtained by using a transistor Q as shown in FIG. 5. That is, FIG. 5 shows a second embodiment of the waveform equalization circuit according to the invention. The second embodiment of a waveform equalization circuit of the present invention comprises: a transistor Q; a first network 14 having a function characteristic represented by a function $H_1(s)$ defined by the following equation, through which a digital signal read from a magnetic medium by a magnetic head is applied to the base 20 of the transistor:

$$H_1(s) = K \cdot \frac{(s + \sigma_1)(s - \sigma_2)}{(s + \sigma_3)(s \pm \sigma_4)} + k$$

where K and k are constants, and $\sigma_1$ through $\sigma_4$ are angular frequencies satisfying relations $\sigma_3 < \sigma_1 < \sigma_4$, and $\sigma_3 < \sigma_2 < \sigma_4$; and a second network 15 having a transfer characteristic represented by a function $H_2(s)$ represented by the following equation, through which the digital signal read from a magnetic medium by a magnetic head is applied to the emitter 21 of the transistor Q: $H_2(s) = k$, wherein the digital signal subjected to waveform equalization is outputted through the collector 22 of the transistor. A resistor $R_{16}$ is connected to the collector 22 of the transistor Q, for converting the collector current representing the transfer characteristic into a voltage. Then, the signal is outputted from the output terminal 12. As described above, in the second embodiment, the first network 14 the same as that used in the first embodiment is connected between the input terminal 11 and the base 20 of the transistor Q. The second network 15 has the same arrangement of the resistors with the second network 15 used in the first embodiment, but the values of the resistors are represented by $R_{14}$ and $R_{15}$. The network 15 is connected between the input terminal 11 and the emitter 21 of the transistor. (It is noted that the first network 14 shown in FIG. 5 may be changed into the network shown in FIG. 4.) In the circuit of FIG. 5, the values of resistors $R_{14}$ and $R_{15}$ are determined according to the following equation (47):

$$k = R_{15}/R_{14} + R_{15} \tag{47}$$

When the mutual conductance of the transistors Q with respect to the collector current as viewed from the base thereof is represented by $gm_1$, and the mutual conductance with an input applied to the point X is represented by $gm_2$, then the following expressions can be obtained:

$$gm_1 \approx \frac{R_{14} + R_{15}}{R_{14} R_{15}} \tag{48}$$

$$gm_2 \approx \frac{1}{R_{14}} \tag{49}$$

In this case, k can be obtained from the following ratio of the conductances:

$$\frac{gm_2}{gm_1} = \frac{R_{15}}{R_{14} + R_{15}} = k \tag{50}$$

and the transfer characteristic as given by the collector current, which is converted into a voltage by means of a resistor $R_{16}$ thus providing an output signal.

In the description of the networks realizing $H_1(s)$ in FIGS. 1 and 4, $R_{10}$ is set to 1 ($\Omega$) for convenience in calculation. However, it should be noted that, when $R_{10}$, $R_{11}$, $C_{10}$ and $C_{11}$ are changed under the condition that the admittance ratio of $R_{11}$, $C_{10}$ and $C_{11}$ obtained with $R_{10} = 1(\Omega)$ is maintained unchanged, the same transfer function $H_1(s)$ can be obtained. That is, when $R_{10}$ is multiplied by a factor of n, $R_{11}$ should be multiplied by a factor of n, and $C_{10}$ and $C_{11}$ should be multiplied by a factor of $1/n$.

As was described above, in the waveform equalization circuit of the present invention, as a result of the single arrangement for angular frequencies can be independently set as factors for determination of the waveform equalization characteristic. Therefore, according to the transfer characteristic of the recording or reproducing system, the most suitable waveform equalization characteristic can be obtained at a low cost.

What is claimed is:

1. A waveform equalization circuit comprising:
   an amplifier having two input terminals, a non-inversion input terminal and an inversion input terminal;
   a first network having a function characteristic represented by a function $H_1(s)$ defined by the following equation, through which a digital signal read by a magnetic head from a magnetic medium is applied to a first one of said two input terminals of said amplifier:

$$H_1(s) = K \cdot \frac{(s + \sigma_1)(s - \sigma_2)}{(s + \sigma_3)(s \pm \sigma_4)} + k$$

where K and k are constants, and $\sigma_1$ through $\sigma_4$ are angular frequencies satisfying relations $$\sigma_3 < \sigma_1 < \sigma_4, \text{ and } \sigma_3 < \sigma_2 < \sigma_4;$$

and a second network having a transfer characteristic represented by a function $H_2(s)$ represented by the following equation, through which said digital signal is applied to a second one of said two input terminals of said amplifier:

$$H_2(s) = k,$$

and means for outputting the digital signal thus subjected to waveform equalization.

2. A waveform equalization circuit as claimed in claim 1, wherein said first network comprises:
a first capacitor;
first resistive means connected in parallel to said first capacitor, said parallely connected first resistive means and said first capacitor being linked to said first of said two input terminals of said amplifier;
a second capacitor serially connected at one end to said parallely connected first capacitor and said first resistive means and which at the other end receives said digital signal read from said magnetic medium by said magnetic head; and
a second resistive means connected between said first one of said two input terminals and ground.

3. A waveform equalization circuit as claimed in claim 1, wherein said first network comprises:
a first capacitor;
first resistive means serially connected to said first capacitor;
a second capacitor parallely connected to said serially connected first capacitor and said first resistive means;
said serially connected first resistive means and said first capacitor is parallel with said second capacitor being linked at one end to said first of said two input terminals of said amplifier and at the other end receiving said digital signal read from said magnetic medium by said magnetic head; and
a second resistive means connected between said first one of said two input terminals and ground.

4. A waveform equalization circuit as claimed in claim 1, wherein said second network comprises:
a first resistive means receiving said digital signal read from said magnetic medium by said magnetic head and connected to said second one of said two input terminals of said amplifier; and
a second resistive means connected between said second one of said two input terminals and ground.

5. A waveform equalization circuit as claimed in claim 2, wherein said second network comprises:
a third resistive means receiving said digital signal read from said magnetic medium by said magnetic head and connected to said second one of said two input terminals of said amplifier; and
a fourth resistive means connected between said second one of said two input terminals and ground.

6. A waveform equalization circuit as claimed in claim 3, wherein said second network comprises:
a third resistive means receiving said digital signal read from said magnetic medium by said magnetic head and connected to said second one of said two input terminals of said amplifier; and
a fourth resistive means connected between said second one of said two input terminals and ground.

7. A waveform equalization circuit comprising:
a transistor;
a first network having a function characteristic represented by a function $H_1(s)$ defined by the following equation, through which a digital signal read from a magnetic medium by a magnetic head is applied to the base of said transistor:

$$H_1(s) = \frac{K(s+\sigma_1)(s-\sigma_2)}{(s + \sigma_3)(s \pm \sigma_4)} + k$$

where K and k are constants, and $\sigma_1$ through $\sigma_4$ are angular frequencies satisfying relations $\sigma_3 < \sigma_1 < \sigma_4$, and $\sigma_3 < \sigma_2 < \sigma_4$; and
a second network having a transfer characteristic represented by a function $H_2(s)$ represented by the following equation, through which said digital signal read from a magnetic medium by a magnetic head is applied to the emitter of said transistor:

$$H_2(s) = k,$$

wherein said digital signal subjected to waveform equalization is outputted through the collector of said transistor.

8. A waveform equalization circuit as claimed in claim 7, further comprising a further resistive means connected to the collector of said transistor, for converting the collector current representing said transfer characteristic into a voltage.

9. A waveform equalization circuit as claimed in claim 7, wherein said first network comprises:
a first capacitor;
first resistive means connected in parallel to said first capacitor, said parallely connected first resistive means and said first capacitor being linked to said base of said transistor;
a second capacitor serially connected at one end to said parallely connected first capacitor and said first resistive means and at the other end receives said digital signal read from said magnetic medium by said magnetic head; and
a second resistive means connected between said base of said transistor and ground.

10. A waveform equalization circuit as claimed in claim 7, wherein said first network comprises:
a first capacitor;
first resistive means serially connected to said first capacitor;
a second capacitor parallely connected to said serially connected first capacitor and said first resistive means;
said serially connected first resistive means and said first capacitor in parallel with said second capacitor being linked at one end to said base of said transistor and at the other end receiving said digital signal read from said magnetic medium by said magnetic head; and a second resistive means connected between said base of said transistor and ground.

11. A waveform equalization circuit as claimed in claim 7, wherein said second network comprises:
  a first resistive means receiving said digital signal read from said magnetic medium by said magnetic head and connected to said emitter of said transistor; and
  a second resistive means connected between said emitter of said transistor and ground.

12. A waveform equalization circuit as claimed in claim 9, wherein said second network comprises:
  a third resistive means receiving said digital signal read from said magnetic medium by said magnetic head and connected to said emitter of said transistor; and
  a fourth resistive means connected between said emitter of said transistor and ground.

13. A waveform equalization circuit as claimed in claim 10, wherein said second network comprises:
  a third resistive means receiving said digital signal read from said magnetic medium by said magnetic head and connected to said emitter of said transistor; and
  a fourth resistive means connected between said emitter of said transistor and ground.

14. A waveform equalization circuit as claimed in claim 12, further comprising a further resistive means connected to the collector of said transistor, for converting the collector current representing said transfer characteristic into a voltage.

15. A waveform equalization circuit as claimed in claim 13, further comprising a further resistive means connected to the collector of said transistor, for converting the collector current representing said transfer characteristic into a voltage.

* * * * *